United States Patent
Isoda et al.

(10) Patent No.: US 12,292,699 B2
(45) Date of Patent: May 6, 2025

(54) DRIVING DEVICE AND PRINTING APPARATUS HAVING A CONNECTION CIRCUIT SWITCHING CONNECTION COMBINATIONS OF LOAD BLOCKS AND DRIVING CIRCUITS

(71) Applicant: CANON KABUSHIKI KAISHA, Tokyo (JP)

(72) Inventors: Naoki Isoda, Tokyo (JP); Mizuki Nagasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 18/348,123

(22) Filed: Jul. 6, 2023

(65) Prior Publication Data

US 2024/0036492 A1 Feb. 1, 2024

(30) Foreign Application Priority Data

Jul. 28, 2022 (JP) .................................. 2022-120713

(51) Int. Cl.
*G03G 15/043* (2006.01)
*G03G 15/01* (2006.01)
*G03G 15/04* (2006.01)

(52) U.S. Cl.
CPC ......... *G03G 15/043* (2013.01); *G03G 15/011* (2013.01); *G03G 15/04054* (2013.01); *G03G 2215/0409* (2013.01)

(58) Field of Classification Search
CPC ............... G03G 15/011; G03G 15/043; G03G 15/04054; G03G 2215/0409
See application file for complete search history.

(56) References Cited

U.S. PATENT DOCUMENTS

| 7,755,411 B2 | 7/2010 | Isoda |
| 8,174,317 B2 | 5/2012 | Isoda |
| 9,712,159 B2 | 7/2017 | Isoda |
| 9,746,865 B2 | 8/2017 | Isoda |
| 9,942,494 B2 | 4/2018 | Isoda |
| 2007/0171478 A1 | 7/2007 | Yaji |
| 2011/0133789 A1 | 6/2011 | Nagumo |

(Continued)

FOREIGN PATENT DOCUMENTS

| CN | 110275406 A | 9/2019 |
| JP | 2007-90571 A | 4/2007 |

(Continued)

OTHER PUBLICATIONS

European Search Report issued Dec. 15, 2023 in corresponding EP Application No. 23183909.3.

(Continued)

*Primary Examiner* — Joseph S Wong
(74) *Attorney, Agent, or Firm* — VENABLE LLP

(57) ABSTRACT

A driving device is provided. The driving device includes a plurality of load blocks each including a load element, a plurality of driving circuits configured to drive the plurality of load blocks, and a connection circuit configured to connect the plurality of load blocks to the plurality of driving circuits, respectively. The connection circuit is configured to switch a connection combination of each of the plurality of load blocks and each of the plurality of driving circuits.

12 Claims, 11 Drawing Sheets

(56) References Cited

U.S. PATENT DOCUMENTS

| | | | | |
|---|---|---|---|---|
| 2014/0168338 A1* | 6/2014 | Yano | ............... | G03G 15/0189 |
| | | | | 347/116 |
| 2015/0117911 A1* | 4/2015 | Kato | ................ | G03G 15/043 |
| | | | | 399/301 |
| 2019/0072872 A1* | 3/2019 | Kinuta | ............ | G03G 15/0216 |
| 2023/0101695 A1 | 3/2023 | Muraki | | |

FOREIGN PATENT DOCUMENTS

| | | |
|---|---|---|
| JP | 2008-166610 A | 7/2008 |
| JP | 2014-215565 A | 11/2014 |
| JP | 2019-64151 A | 4/2019 |
| KR | 20210112391 A | 9/2021 |
| WO | 2020/154547 A1 | 7/2020 |

OTHER PUBLICATIONS

Indian Examination Report issued Mar. 21, 2024 in corresponding Indian Application No. 202344047903 (English language machine translation included).

Korean Office Action issued Feb. 3, 2025 during prosecution of related Korean Application No. 10-2023-0082294 (English machine translation included).

* cited by examiner

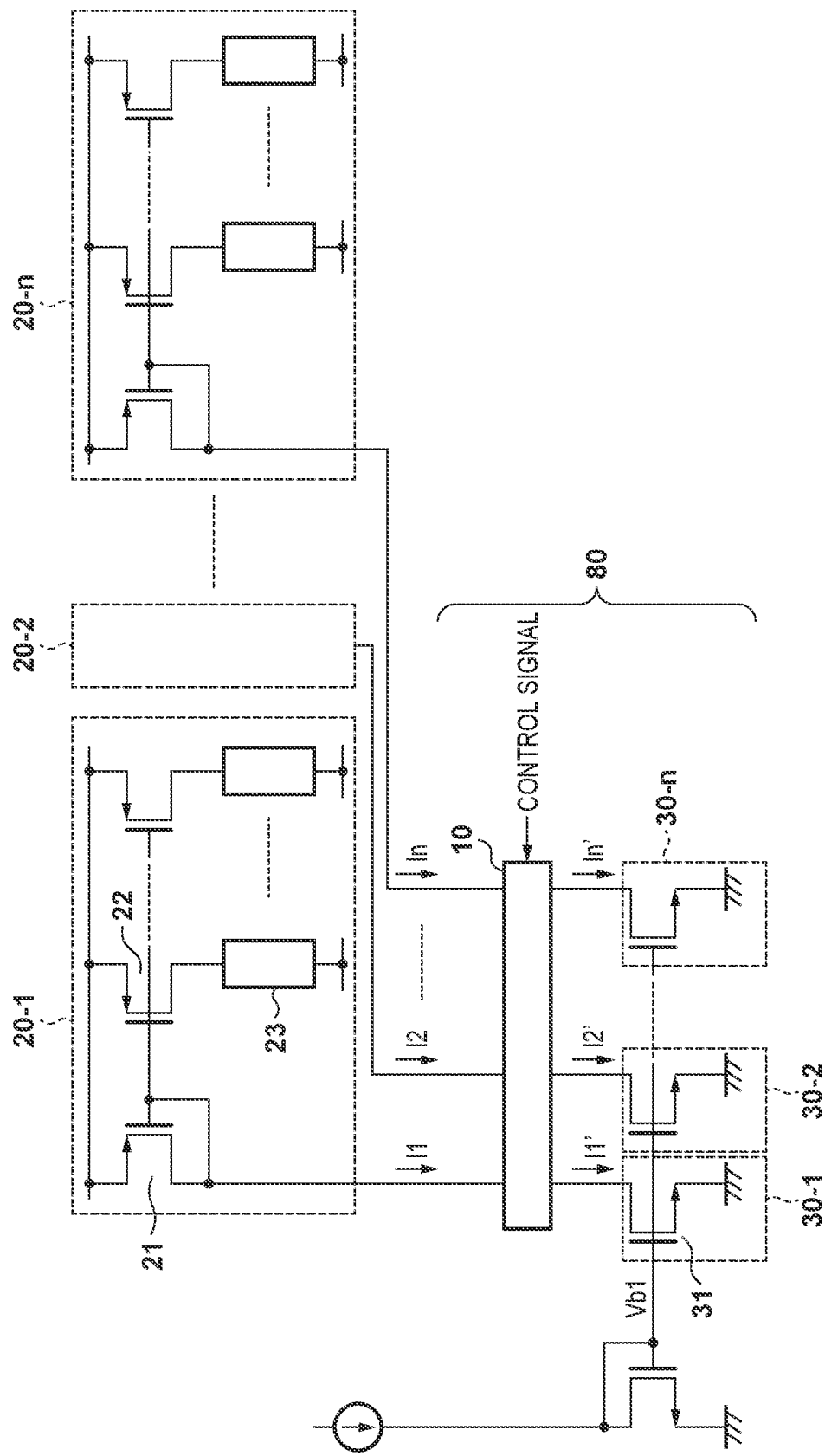

FIG. 2B
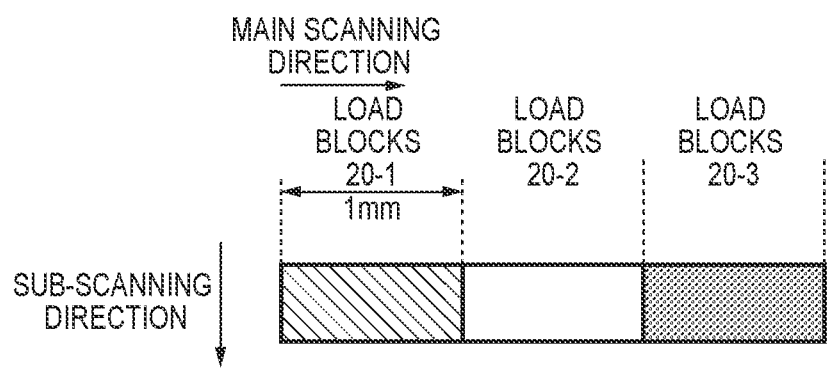
FIG. 2C
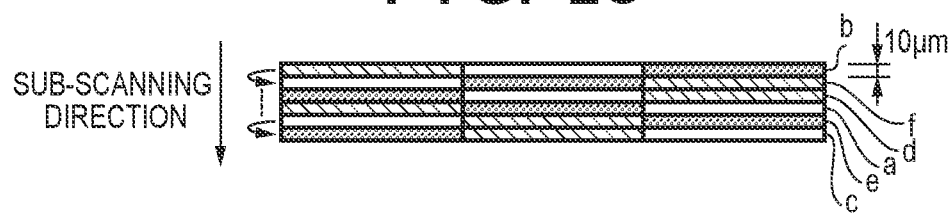
FIG. 2D
| CONTROL SIGNAL | CORRESPONDENCE OF CURRENT | | |
|---|---|---|---|
| | $I1=$ | $I2=$ | $I3=$ |
| b | $I1'$ | $I3'$ | $I2'$ |
| f | $I3'$ | $I2'$ | $I1'$ |
| d | $I2'$ | $I3'$ | $I1'$ |
| a | $I1'$ | $I2'$ | $I3'$ |
| e | $I3'$ | $I1'$ | $I2'$ |
| c | $I2'$ | $I1'$ | $I3'$ |

| CONTROL SIGNAL | CONNECTED TAP | | |
|---|---|---|---|
| | sw1 | sw2 | sw3 |
| a | 1 | 2 | 3 |
| b | 1 | 3 | 2 |
| c | 2 | 1 | 3 |
| d | 2 | 3 | 1 |
| e | 3 | 1 | 2 |
| f | 3 | 2 | 1 |

FIG. 5B
| CONTROL SIGNAL | CONNECTED TAP | | | | |
|---|---|---|---|---|---|
| | sw1 | sw2 | ... | sw19 | sw20 |
| time1 | 1 | 2 | | 19 | 20 |
| time2 | 2 | 3 | | 20 | 1 |
| time3 | 3 | 4 | ... | 1 | 2 |
| ... | ... | ... | | ... | ... |
| time19 | 19 | 20 | | 17 | 18 |
| time20 | 20 | 1 | | 18 | 19 |
FIG. 5C
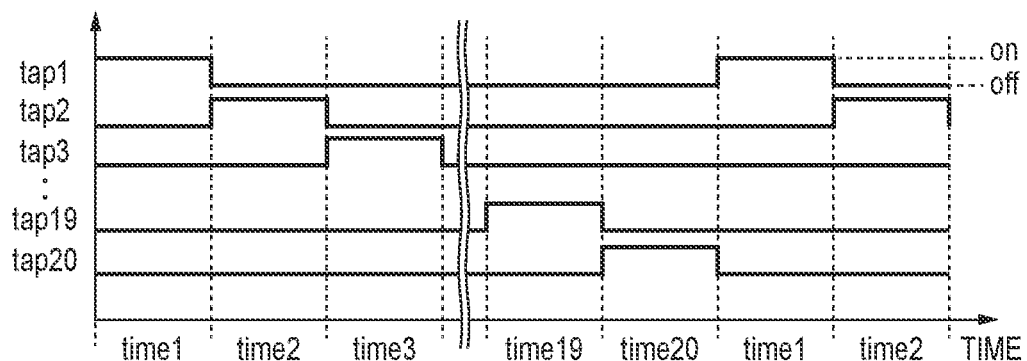
FIG. 5D
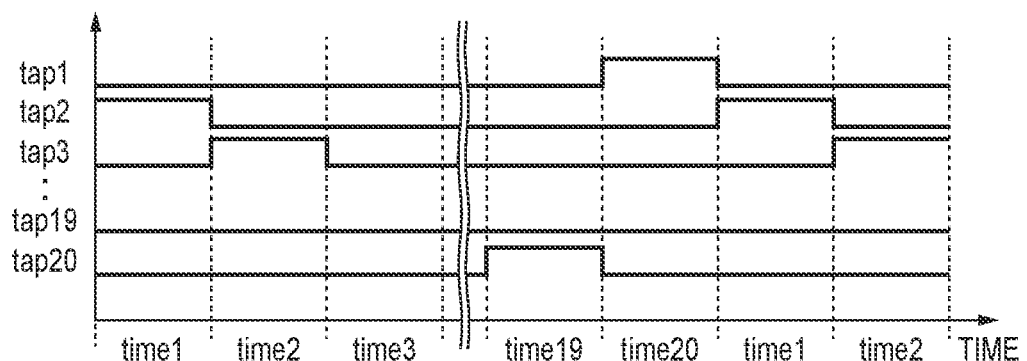

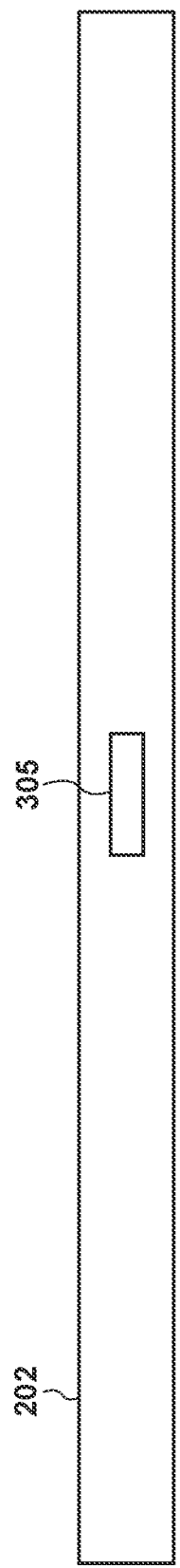
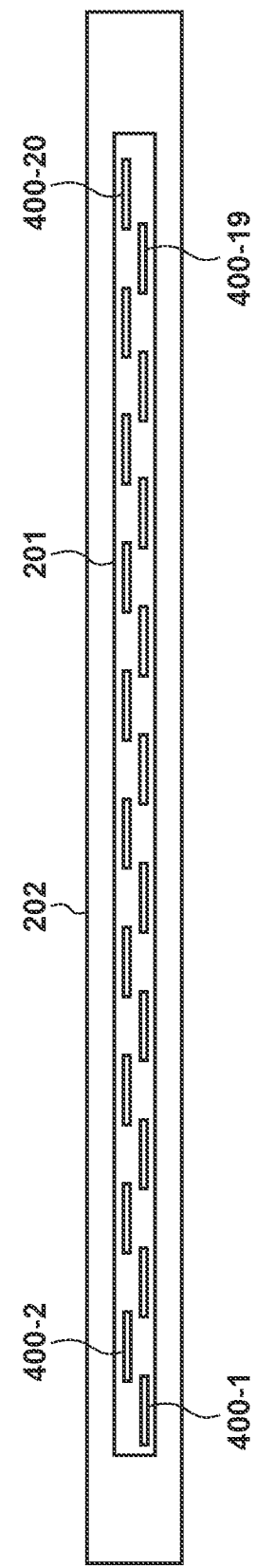

DRIVING DEVICE AND PRINTING APPARATUS HAVING A CONNECTION CIRCUIT SWITCHING CONNECTION COMBINATIONS OF LOAD BLOCKS AND DRIVING CIRCUITS

BACKGROUND OF THE INVENTION

Field of the Invention

The present invention relates to a driving device and a printing apparatus.

Description of the Related Art

At the time of printing an image and the like by driving load elements such as resistance elements and light emitting elements, the characteristics of the plurality of load elements may vary, thereby generating unevenness in the printed image. Japanese Patent Laid-Open No. 2007-090571 describes an arrangement in which a pseudo random number generating circuit and an LED characteristic variation data memory storing a variation in characteristic between LED elements are provided and unevenness is suppressed by injecting, to input image data, random number noise corresponding to the characteristics of the LED elements.

SUMMARY OF THE INVENTION

Characteristics may vary not only between load elements but also between a plurality of driving circuits for driving the load elements. If the characteristics vary between the plurality of driving circuits, driving amounts by which the driving circuits drive the load elements, respectively, may vary between the plurality of load elements, thereby generating unevenness in a printed image.

Some embodiments of the present invention provide a technique advantageous in lowering visible sensitivity to unevenness caused by a variation in driving amount between load elements.

According to some embodiments, a driving device comprising a plurality of load blocks each including a load element, a plurality of driving circuits configured to drive the plurality of load blocks, and a connection circuit configured to connect the plurality of load blocks to the plurality of driving circuits, respectively, wherein the connection circuit is configured to switch a connection combination of each of the plurality of load blocks and each of the plurality of driving circuits, is provided.

Further features of the present invention will become apparent from the following description of exemplary embodiments (with reference to the attached drawings).

BRIEF DESCRIPTION OF THE DRAWINGS

FIG. 1 is a circuit diagram showing an example of the arrangement of a driving device according to an embodiment;

FIGS. 2A to 2D are views for explaining the effect of the driving device shown in FIG. 1;

FIG. 5B is a table showing examples of a connection combination;

FIGS. 5C and 5D are timing charts showing an operation;

FIGS. 8A and 8B are views showing an example of the arrangement of the exposure head of the printing apparatus shown in FIG. 6.

DESCRIPTION OF THE EMBODIMENTS

Figure 2A:
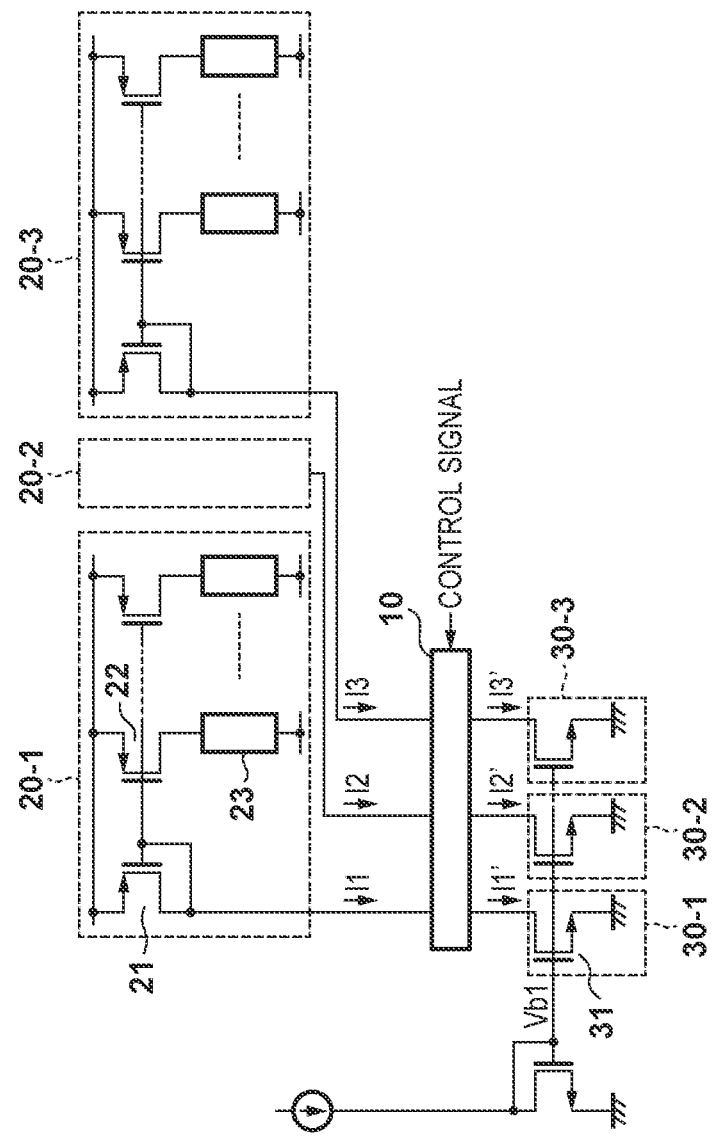

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

A driving device according to an embodiment of the present disclosure will be described with reference to FIGS. 1 to 5D. FIG. 1 is a circuit diagram showing an example of the arrangement of a driving device 80 according to this embodiment. The driving device 80 includes a plurality of driving circuits 30 that respectively drive a plurality of load blocks 20 each including load elements 23. In the arrangement shown in FIG. 1, n driving circuits 30 are arranged in the driving device 80. If, among the plurality of driving circuits 30, a specific driving circuit 30 is indicated, a suffix is added to a reference numeral, like "driving circuit 30-1". If the driving circuits 30 need not particularly be discriminated, they will be referred to as the "driving circuit 30". The same applies to other constituent elements.

Each of the plurality of driving circuits 30 includes a transistor 31 that supplies a current corresponding to a voltage signal. A common voltage signal Vb1 is input to the gate terminal of the transistor 31, and the transistor 31 supplies a current corresponding to the voltage signal Vb1. In the arrangement shown in FIG. 1, the driving circuit 30 is formed by the transistor 31 as an nMOS transistor. The transistors 31 in the driving circuits 30 have the same structure, and can basically generate equal drain currents.

The current generated by the transistor 31 of the driving circuit 30 is supplied to the predetermined load block 20. In each of the plurality of load blocks 20, the plurality of load elements 23 are arranged. In this embodiment, as shown in FIG. 1, the load elements 23 arranged in the plurality of load blocks 20 are arranged along one direction (to be referred to as the main scanning direction hereinafter). In the arrangement shown in FIG. 1, the number of load blocks 20 driven by the driving device 80 is n that is equal to the number of driving circuits 30. That is, the number of the plurality of load blocks 20 is equal to the number of the plurality of driving circuits 30. However, the present invention is not limited to this. For example, the number of driving circuits 30 arranged in the driving device 80 may be larger than the number of load blocks 20.

The load block 20 supplies the current, supplied from the driving circuit 30, to the load elements 23 arranged in a line in the main scanning direction via a current mirror formed by transistors 21 and 22. In the arrangement shown in FIG. 1, the transistors 21 and 22 are pMOS transistors. In the load blocks 20, the current mirror ratios of the current mirrors each formed by the transistors 21 and 22 are designed to be equal to each other. That is, the current amounts supplied to the load elements 23 in all the load blocks 20 are basically equal to each other. The load element 23 can be a current-driven element. This embodiment assumes that the load element 23 is a light emitting element. For example, the load element 23 is an LED having a current ON/OFF switch. In this case, the load element 23 can also called a light emitting thyristor. However, the load element 23 is not limited to this, and may be another element such as an organic light emitting element or a resistance element.

In the driving device 80, a connection circuit 10 that connects each of the plurality of load blocks 20-1 to 20-$n$ to a predetermined one of the plurality of driving circuits 30-1 to 30-$n$ is further arranged. The connection circuit 10 is formed by a switching network and an example of the arrangement of the connection circuit 10 will be described later. The connection circuit 10 switches a connection combination of each of the plurality of load blocks 20-1 to 20-$n$ and each of the plurality of driving circuits 30-1 to 30-$n$. For example, the connection circuit 10 connects the load block 20-1 and the driving circuit 30-1 during a given period, and connects the load block 20-1 and the driving circuit 30-2 during a next period. The connection circuit 10 may receive a control signal supplied from the outside of the driving device 80, and switch the connection combination of the load block 20 and the driving circuit 30. Alternatively, the connection circuit 10 may switch, using a clock signal as a control signal supplied from the outside of the driving device 80, the connection combination of the load block 20 and the driving circuit 30 every time a predetermined number of clocks are input. The connection circuit 10 switches the one-to-one connection combination of the load block 20 and the driving circuit 30 as a current path formed by the load block 20 and the driving circuit 30.

A circuit including the driving device 80 and the plurality of load blocks 20 shown in FIG. 1 can be formed on, for example, a semiconductor substrate that is long in the main scanning direction. The substrate on which the circuit including the driving device 80 and the plurality of load blocks 20 is arranged is arranged to face a light receiving unit that receives light emitted from the load elements 23. A surface of the light receiving unit, which receives light from the load elements 23, moves in a direction (sub-scanning direction) intersecting the main scanning direction. Although an example of the arrangement will be described later, the light receiving unit can be, for example, a photosensitive drum of a printing apparatus such as an image forming apparatus.

For example, the threshold voltages of the transistors 31 arranged in the driving circuits 30 may vary due to a variation in a manufacturing step. Therefore, drain currents generated in correspondence with the input of the voltage signal Vb1 also vary. If the drain currents of the transistors 31 arranged in the driving circuits 30 vary, a current flowing to drive the load element 23 arranged in each load block 20 also varies between the load blocks 20 each supplied with the current from the corresponding driving circuit 30. If the current flowing through the load element 23 varies between the load blocks 20, the light emission amount of the load element 23 as a light emitting element changes for each load block 20, resulting in light amount unevenness between the load blocks 20.

The light amount unevenness between the load blocks 20 is printed as a latent image on the photosensitive drum arranged to face the substrate on which the load blocks 20 are formed, and finally appears as luminous unevenness of the photosensitive drum. In a case where the load element 23 is an LED incorporating a current ON/OFF switch, brightness/darkness of latent image dots is generated on the photosensitive drum. The luminous amounts in the generated brightness data of the latent image dots are all the same in design. However, since the drain current amount generated by the transistor 31 arranged in each driving circuit 30 varies, the luminous amount that has the proportional relationship with the current amount for driving the load element 23 also varies, thereby causing luminous unevenness between the load blocks 20 in the main scanning direction.

Next, an effect of switching the connection combination of the load block 20 and the driving circuit 30 by the connection circuit 10 will be described with reference to FIGS. 2A to 2D. As shown in FIG. 2A, assume that three load blocks and three driving circuits 30 (the load blocks 20-1 to 20-3 and the driving circuits 30-1 to 30-3) are arranged. A length in the main scanning direction in which the load elements 23 of one load block 20 are arranged is 1 mm. As described above, currents I1' to I3' generated by the transistors 31 of the driving circuits 30-1 to 30-3 vary. That is, the currents I1' to I3' have a relationship of I1'≠I2'≠I3'.

FIG. 2B shows a light receiving result image of the photosensitive drum in a case where the connection circuit 10 does not switch the connection combination of the load block 20 and the driving circuit 30. In other words, the load block 20-1 and the driving circuit 30-1 are always connected, the load block 20-2 and the driving circuit 30-2 are always connected, and the load block 20-3 and the driving circuit 30-3 are always connected without arranging the connection circuit 10 between the load blocks 20 and the driving circuits 30. Since the currents I1' to I3' generated by the transistors 31 of the driving circuits 30-1 to 30-3 vary, the light emission amounts of the light emitting elements as the load elements 23 in the load blocks 20-1 to 20-3 vary. Therefore, luminous unevenness is generated between the load blocks 20 in the main scanning direction on the photosensitive drum, and is conspicuously, visually perceived in the sub-scanning direction as the moving direction of the photosensitive drum.

FIG. 2C shows a case where the connection circuit 10 sequentially switches the connection combination of each of the load blocks 20-1 to 20-3 and each of the plurality of driving circuits 30-1 to 30-3. FIG. 2D shows the relationship among currents I1 to I3 flowing through the load blocks 20-1 to 20-3 and the currents I1' to I3' generated by the driving circuits 30-1 to 30-3 by switching by the connection circuit 10 in the arrangement shown in FIG. 2A. It can be said that FIG. 2D shows the connection combinations of the load blocks 20-1 to 20-3 and the driving circuits 30-1 to 30-3.

The connection circuit 10 sequentially switches the connection combination of the load block 20 and the driving circuit 30 in accordance with a control signal supplied from the outside of the driving device 80, as shown in FIG. 2D. In the example shown in FIG. 2C, every time the photosensitive drum moves in the sub-scanning direction by 10 μm, the connection circuit 10 switches the connection combination of the load block 20 and the driving circuit 30. FIG. 2C shows a case where the connection circuit 10 switches the connection combination of the load block 20 and the driving circuit 30 in accordance with movement in the sub-scanning direction of the photosensitive drum, but the present invention is not limited to this. For example, the connection circuit 10 may switch the connection combination of the load block 20 and the driving circuit 30 based on time. In this case, for example, the connection combination of the load block 20 and the driving circuit 30 may be switched, for example, for every predetermined time, at a predetermined timing, or at a random timing.

In the arrangement shown in FIG. 2C, a length by which the photosensitive drum moves in the sub-scanning direction while the connection circuit 10 switches the connection combination of the load block 20 and the driving circuit 30 is short. Therefore, a pitch at which luminous unevenness appears in the sub-scanning direction due to the variation of the currents I1' to I3' generated by the driving circuits 30-1 to 30-3 is also small. As a result, the visibility of unevenness of a printed image caused by luminous unevenness lowers. Alphabets a to f described in FIG. 2C represent control signals a to f shown in FIG. 2D, and indicate the connection combinations of the load blocks 20-1 to 20-3 and the driving circuits 30-1 to 30-3.

In this embodiment, the connection circuit 10 sequentially switches the connection combination of each of the plurality of load blocks 20 and each of the plurality of driving circuits 30. Thus, even in a case where the characteristics of the transistors 31 of the driving circuits 30 vary and the driving amounts (current amounts) for the load elements 23 driven by the driving circuits 30 vary, it is possible to disperse the variation in the sub-scanning direction by increasing a spatial frequency. For example, in accordance with the Visual Transfer Function (VTF), visible sensitivity to unevenness caused by the variation of the transistors 31 of the driving circuits 30 can be lowered.

Figure 3A:
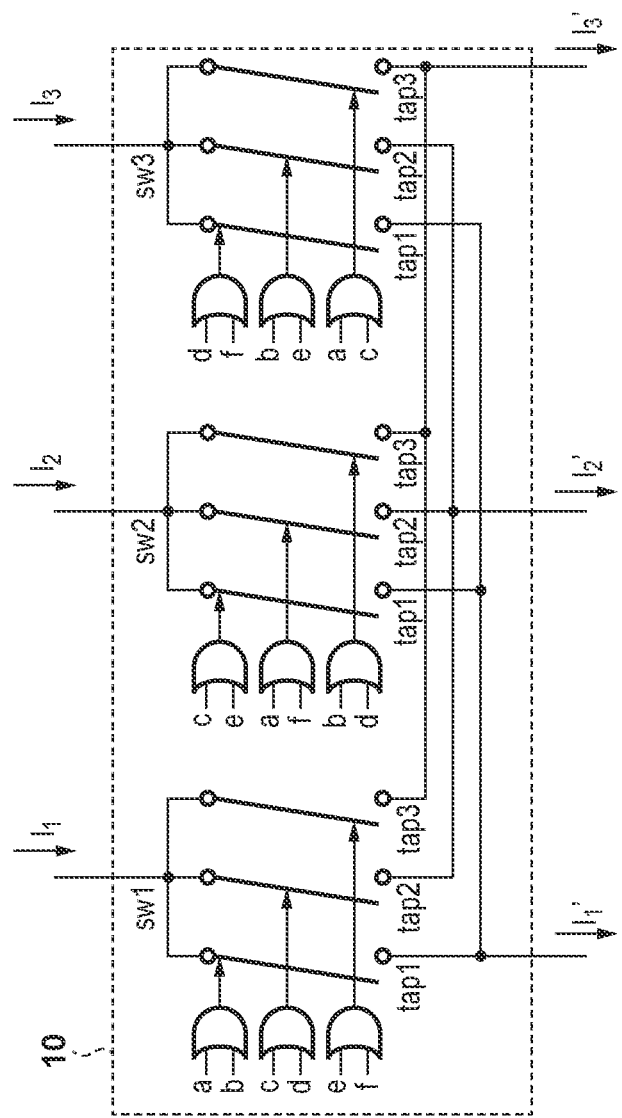
FIG. 3A is a circuit diagram showing an example of the arrangement of a connection circuit of the driving device shown in FIG. 1.
Figures 3B, 3C:
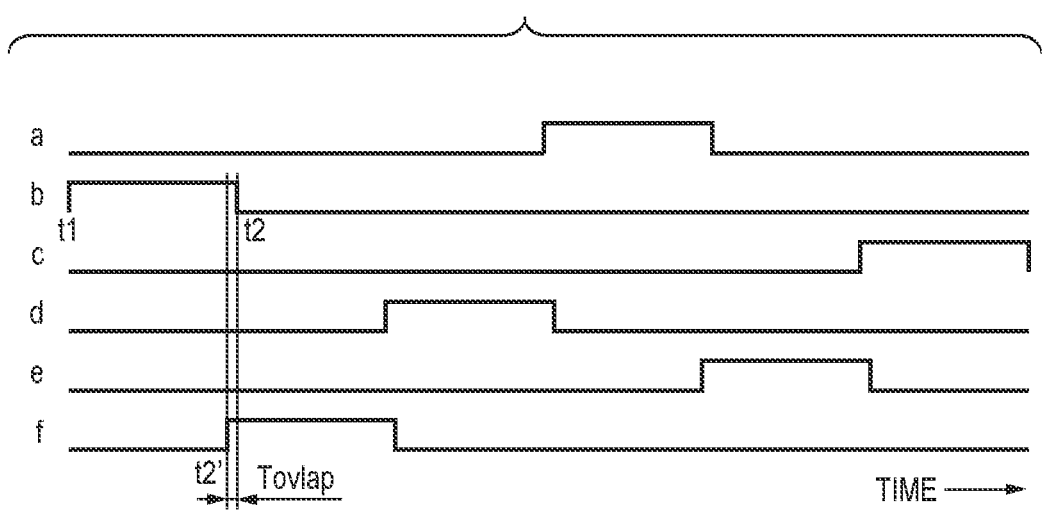
FIG. 3B is a table showing examples of a connection combination.
FIG. 3C is a timing chart showing an operation.

Practical examples of the arrangement and operation of the connection circuit 10 will be described next with reference to FIGS. 3A to 3C. FIG. 3A is a circuit diagram showing an example of the arrangement of the connection circuit 10. FIG. 3B is a table showing connection combinations in the connection circuit 10. FIG. 3C is a timing chart showing the operation of the connection circuit 10.

As shown in FIG. 2A, the connection circuit 10 shown in FIG. 3A includes the three load blocks 20 and the three driving circuits 30. Therefore, in the connection circuit 10, three switch sw1 to sw3 each including three connection taps tap1 to tap3 for each load block 20 are arranged.

There are connection combination patterns of the load blocks 20 and the driving circuits 30, the number of which is equal to the factorial (n!) of the number (n) of load blocks 20. In a case where there are the three load blocks 20, there are six connection combination patterns of the load blocks 20 and the driving circuits 30 that are controlled by the control signals a to f shown in FIG. 2D. In this case, in accordance with the control signals a to f, the taps connected in the switches sw1 to sw3 arranged in the connection circuit 10 are as shown in FIG. 3B.

FIG. 3C shows the timing of the operation of the connection circuit 10. The control signal b is set at High at time t1, and is set at Low at time t2. During a period in which the control signal b is at High, the switch sw1 is connected to the tap tap1, the switch sw2 is connected to the tap tap3, and the switch sw3 is connected to the tap tap2. Therefore, during this period, the load block 20-1 is connected to the driving circuit 30-1, the current I1 flowing through the load block 20-1 is the current I1' generated by the driving circuit 30-1. Similarly, during this period, the load block 20-2 is connected to the driving circuit 30-3, the current I2 flowing through the load block 20-2 is the current I3' generated by the driving circuit 30-3. In addition, the load block 20-3 is connected to the driving circuit 30-2, the current I3 flowing through the load block 20-3 is the current I2' generated by the driving circuit 30-2.

After that, logical operations according to the control signals a to f are performed in synchronism with the time during which the photosensitive drum moves by a predetermined distance in the sub-scanning direction. This switches the currents I1 to I3 flowing through the load blocks 20-1 to 20-3 among the currents I1' to I3' generated by the driving circuits 30-1 to 30-3, as shown in FIG. 2D. Thus, the above-described effect shown in FIG. 2C can be obtained.

Furthermore, as shown in FIG. 3C, when the control signal b is set at Low at time t2, and is switched to the control signal f, the control signal f may be supplied from time t2' before time t2 at which the control signal b is set at Low. An overlapping period Tovlap during which the control signals b and f are supplied simultaneously is provided. This can suppress the current path formed by the load block 20 and the driving circuit 30 from being instantaneously interrupted at the time of switching the tap in each switch sw. For example, attention is paid to the load block 20-1 that is driven by the driving circuit 30-1 until time t2. The connection circuit 10 switches driving of the load block 20-1 driven by the driving circuit 30-1 to driving by the driving circuit 30-3. At this time, the connection circuit 10 switches the connection combination so that the driving by the driving circuit 30-3 is started (at time t2') before the driving by the driving circuit 30-1 ends (time t2). By further using the effect of the overlapping period Tovlap, it is possible to smoothly change the current flowing through the current path in a case where the combination of the load block 20 and the driving circuit 30 is switched.

As described above, the driving device 80 according to this embodiment is used. This can suppress unevenness of a printed image from being generated due to the variation of the light emission amounts of the load elements 23 caused by the variation of the driving amounts of the load elements 23 caused by the variation of the characteristics of the transistors 31 of the driving circuits 30 at the time of printing an image by driving the load elements 23. More specifically, control of switching the connection combination of the load block 20 and the driving circuit 30 by the connection circuit 10 is executed in synchronism with movement in the sub-scanning direction of the photosensitive drum. This can lower the visible sensitivity to unevenness caused by the variation of the transistors 31 of the driving circuits 30. Furthermore, as shown in FIG. 3A, the connection circuit 10 can be implemented by a simple circuit arrangement. Thus, the driving device 80 of this embodiment can improve the image quality of the printed image. The above-described printed image includes not only a picture but also a graph, a graphic, and a character.

In the above example, the load blocks 20 are one-dimensionally arranged and the photosensitive drum is moved in a direction different from the direction in which the load blocks 20 are arranged. However, the present disclosure is applied not only this example. For example, the load blocks 20 (load elements 23) may two-dimensionally be arranged in a matrix. There may be a case where display or the like is performed with a predetermined light amount in an illumination device used for a display device, a backlight, or the like. In this case, the connection combination of the load block 20 and the driving circuit 30 is switched using the above-described connection circuit 10. This can cause the two-dimensionally arranged load blocks 20 (load elements 23) to emit light with an averaged uniform light amount within a two-dimensional plane.

Figure 4:
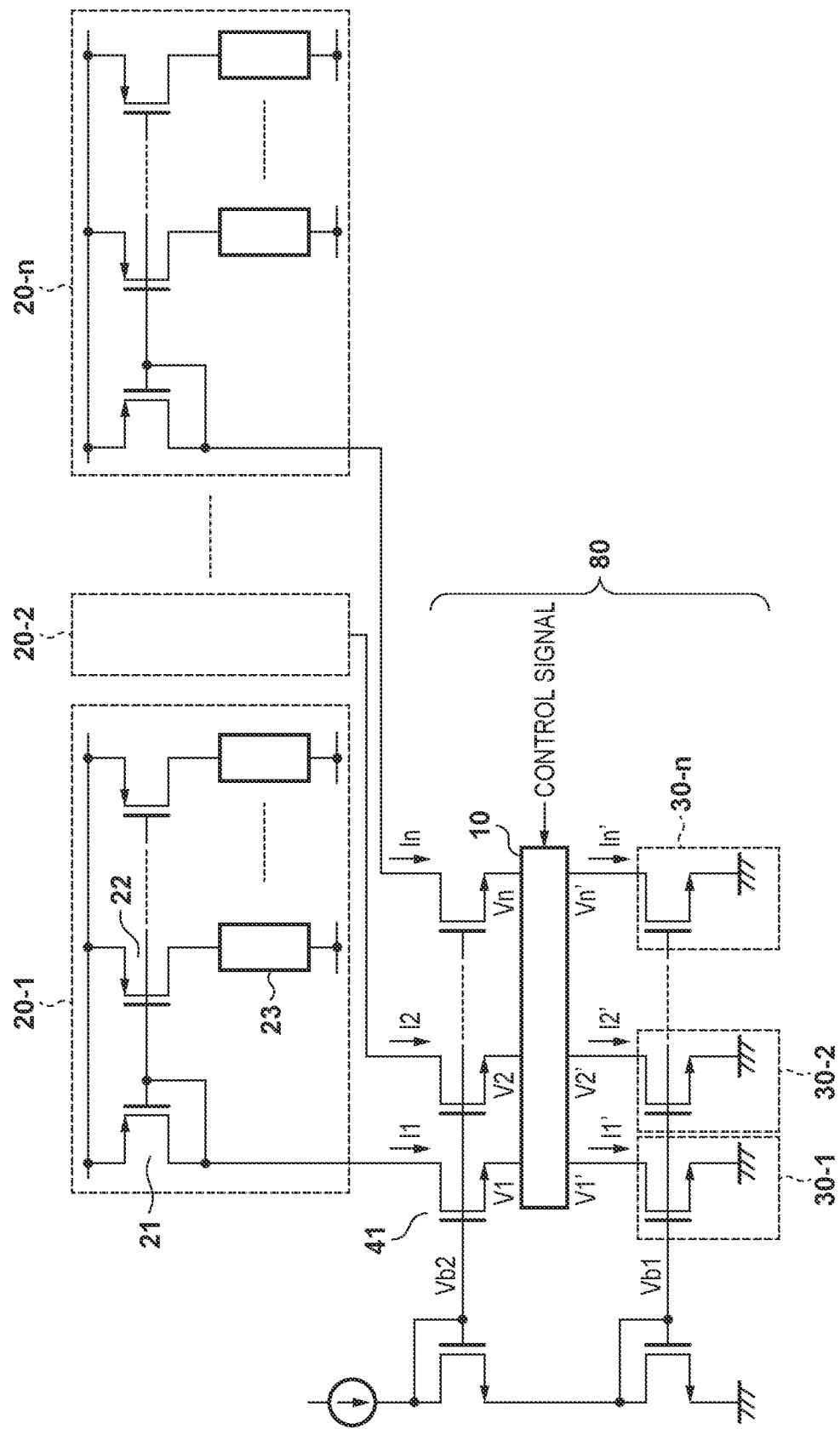
FIG. 4 is a circuit diagram showing a modification of the driving device shown in FIG. 1.

FIG. 4 is a circuit diagram showing a modification of the driving device 80 shown in FIG. 1. In the driving device 80 shown in FIG. 4, a transistor 41 is further arranged between the load block 20 and the driving circuit 30 in each current path formed by the load block 20 and the driving circuit 30 that are connected to each other, as compared with the arrangement shown in FIG. 1. At this time, the transistor 31 of the driving circuit 30 and the transistor 41 form a cascode circuit. In the arrangement shown in FIG. 4, in each current path formed by the load block 20 and the driving circuit 30 that are connected to each other, the connection circuit 10 is arranged between the transistors 31 and 41. The remaining arrangement may be the same as that of the above-described driving device 80 shown in FIG. 1. In addition, the operation of the connection circuit 10 may be the same as that shown in FIGS. 3A to 3C described above.

Next, an effect of arranging the transistors 41 will be described. In each current path, a common voltage signal Vb2 is input to the gate terminal of the transistor 41 as the grounded base transistor of the cascode circuit. Therefore, potentials V1 to Vn on the source sides of the transistors 41 are almost equal to each other. Thus, potentials V1' to Vn' of the drains of the transistors 31 via the connection circuit 10 are also almost equal to each other.

As described above, the potentials V1 to Vn and the potentials V1' to Vn' have almost the same value. Therefore, when switching the connection combination of the load block 20 and the driving circuit 30, a potential variation between a terminal of the connection circuit 10 connected to the transistor 31 and a terminal of the connection circuit 10 connected to the transistor 41 is small. Since, when switching the connection combination, a potential variation between the terminals for external connection of the connection circuit 10 is small, it is possible to suppress occurrence of an extra charge/discharge current by a load as a parasitic capacity existing at each connecting point that connects the load block 20 and the driving circuit 30. As a result, the variation of the current I' generated by the driving circuit 30 when switching the combination of the load block 20 and the driving circuit 30 is suppressed. Since the variation of the current I' generated by the driving circuit 30 is small, even if the connection circuit 10 performs an operation of switching the combination of the load block 20 and the driving circuit 30 at a higher speed, the variation of the light emission amounts of the load elements 23 at the time of switching is small, thereby decreasing the influence on image quality.

If the number of load blocks 20 increases, the number of logic circuits and the number of wiring patterns increase in the arrangement shown in FIG. 3A, and the arrangement may become complicated. FIGS. 5A to 5D show other examples of the arrangement and operation of the connection circuit 10, which are different from the above-described examples shown in FIGS. 3A to 3C. FIGS. 5A to 5D show an arrangement example and an operation example in a case where the combination with the driving circuit 30 is cyclically switched with respect to the load block 20.

Figure 5A:
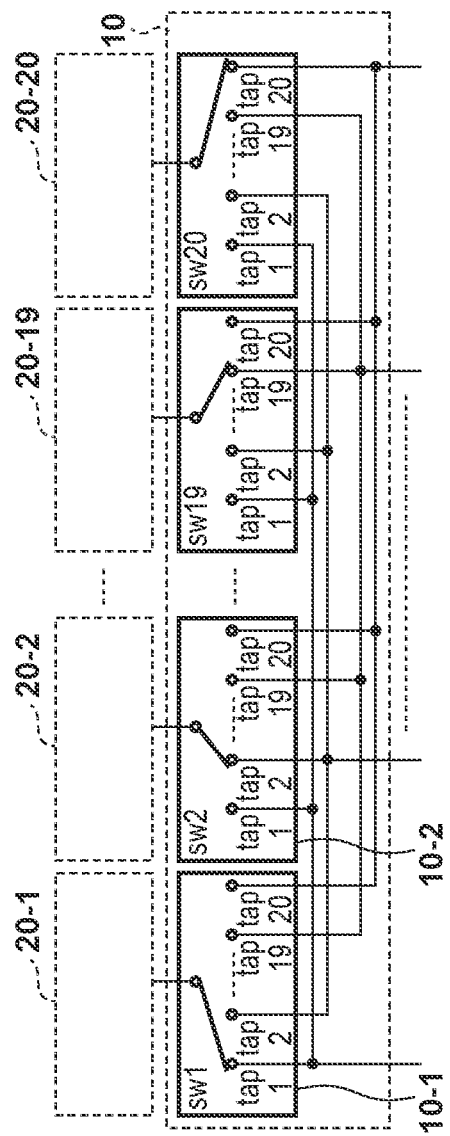
FIG. 5A is a circuit diagram showing a modification of the connection circuit shown in FIG. 3A.

FIG. 5A is a circuit diagram showing an example of the arrangement of the connection circuit 10 in a case where the combination of the load block 20 and the driving circuit 30 is cyclically switched. In the arrangement shown in FIG. 5A, 20 load blocks 20 of load blocks 20-1 to 20-20 are arranged. In this case, 20 driving circuits 30 can be arranged in the driving device 80. In the driving device 80, 21 or more driving circuits 30 may be arranged. FIG. 5B is a table showing connection combinations in the connection circuit 10. FIGS. 5C and 5D are timing charts showing the operation of the connection circuit 10. FIG. 5C shows the operation of a switch sw1 among switches sw1 to sw20 arranged in the connection circuit 10. FIG. 5D shows the operation of the switch sw2 among the switches sw1 to sw20 arranged in the connection circuit 10.

As shown in FIGS. 5A to 5D, similar to the above-described embodiment, for example, a control signal time changes to time1, time2, . . . , time20, time1, and time2 in synchronism with movement in the sub-scanning direction of the photosensitive drum. In accordance with the change of the control signal time, a connected tap tap1 to tap20 is cyclically switched to an adjacent tap in each of the switches sw1 to sw20 of the connection circuit 10.

A circuit for switching the connection of the tap of each switch sw can be formed by, for example, a simple shift register circuit. In this case, the control signal time may be a clock signal supplied to the driving device 80. Every time the clock signal is input, the control signal time cyclically changes to time1, time2, . . .

As described above, the arrangement shown in FIG. 5A can suppress an increase in number of logic circuits or wiring patterns even if the number of load blocks 20 increases, thereby simplifying the circuit arrangement. As a result, the chip size of the connection circuit 10 is reduced, and it is possible to relax a restriction on the chip size of the connection circuit 10.

In the arrangement and operation shown in FIGS. 5A to 5D as well, by using the driving device 80 of this embodiment, it is possible to suppress unevenness of a printed image from being generated due to the variation of the characteristics, such as light emission amounts, of the load elements 23 caused by the variation of the characteristics of the transistors 31 of the driving circuits 30 at the time of printing an image by driving the load elements 23. That is, even if the number of load blocks 20 to be driven increases, the driving device 80 including the connection circuit 10 that implements the arrangement and operation shown in FIGS. 5A to 5D can implement the same effect as the above-described one by a simpler circuit arrangement.

Figure 6:
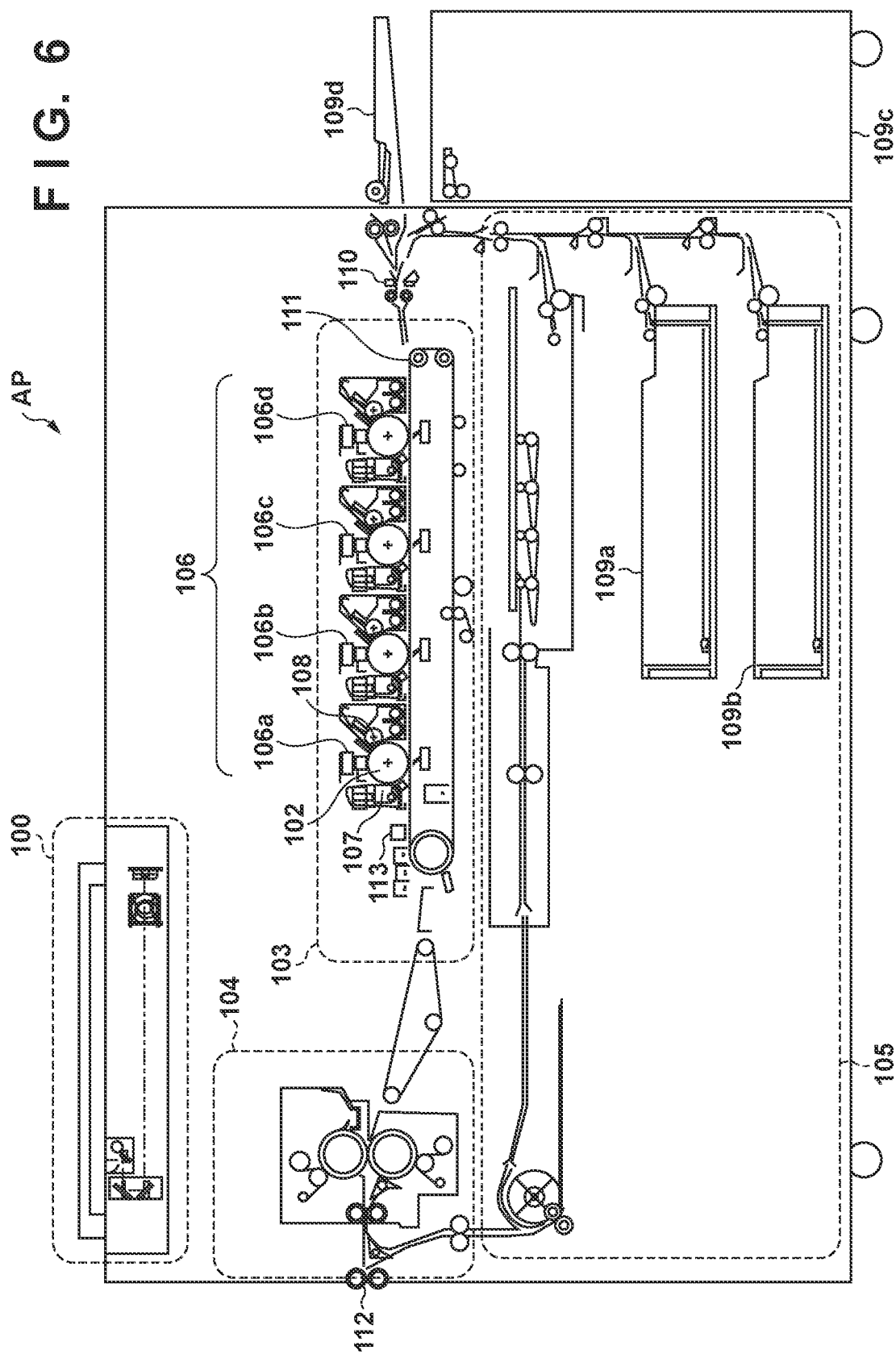
FIG. 6 is a view showing an example of the arrangement of a printing apparatus including the driving device shown in FIG. 1.

Next, as an application of the driving device 80 according to this embodiment, a printing apparatus including the driving device 80 will be described. FIG. 6 shows an example of the overall arrangement of an electrophotographic image forming apparatus AP. The image forming apparatus AP is an example of the printing apparatus. The image forming apparatus AP includes a scanner unit 100, an image forming section 103, a fixing unit 104, a paper feed/conveyance unit 105, and a printer control unit (not shown) that controls the above units.

The scanner unit 100 optically reads an original image by illuminating an original placed on an original platen glass, and converts the image into an electrical signal, thereby generating image data. The image forming section 103 rotationally drives a photosensitive drum 102 to charge the photosensitive drum 102 by a charger 107.

An exposure head 106 emits light in accordance with the image data, and collects light emitted by the chip surface of an arrayed light emitting element group to the photosensitive drum 102 by a rod lens array, thereby forming an electrostatic latent image. Exposure heads 106a, 106b, 106c, and 106d shown in FIG. 6 show the arrangement of four exposure heads for supporting 4-color full color. The above-described driving device 80 can be arranged on the exposure heads 106. Light emitting elements are mounted, on the exposure heads 106, as the load elements 23 driven by the driving circuits 30 arranged in the driving device 80.

A developer 108 develops toner with respect to the electrostatic latent image formed on the photosensitive drum 102. The developed toner image is transferred onto a paper sheet conveyed onto a transfer belt 111.

The image forming section 103 includes four image forming units that perform a series of electrophotographic processes (charge, exposure, development, and transfer), and arranges them in order of cyan (C), magenta (M), yellow (Y), and black (K), thereby forming a full-color image. The four image forming units sequentially execute magenta, yellow, and black image forming operations after a predetermined time elapses since image forming of a cyan station starts.

In the paper feed/conveyance unit 105, a paper sheet is fed from a paper feed unit instructed in advance among paper feed units 109a and 109b in a main body, an external paper feed unit 109c, and a manual paper feed unit 109d, and is conveyed to registration rollers 110. The registration rollers 110 convey the paper sheet onto the transfer belt 111 at a timing when the toner images formed by the above-described image forming section 103 are transferred onto the paper sheet. An optical sensor 113 is arranged at a position facing the transfer belt 111, and detects the position of a test chart printed on the transfer belt 111 to derive a color misregistration amount between the stations. An image controller unit (not shown) is notified of the derived color misregistration amount, the image position of each color is corrected. This control transfers the full-color toner image without color misregistration onto the paper sheet. The fixing unit 104 is formed by a combination of rollers, incorporates a heat source such as a halogen heater, melts the toner on the paper sheet onto which the toner image has been transferred from the transfer belt 111 with heat and pressure, and fixes the toner image, thereby discharging the paper sheet to the outside of the image forming apparatus by discharge rollers 112.

The printer control unit communicates with a MultiFunction Peripheral (MFP) control unit (not shown) that controls the overall MFP and executes control in accordance with an instruction of the control unit, and also sends an instruction to smoothly perform an operation by maintaining harmony as a whole while managing the states of the above-described scanner unit, image forming portion, fixing unit, and paper feed/conveyance unit.

Figure 7A:
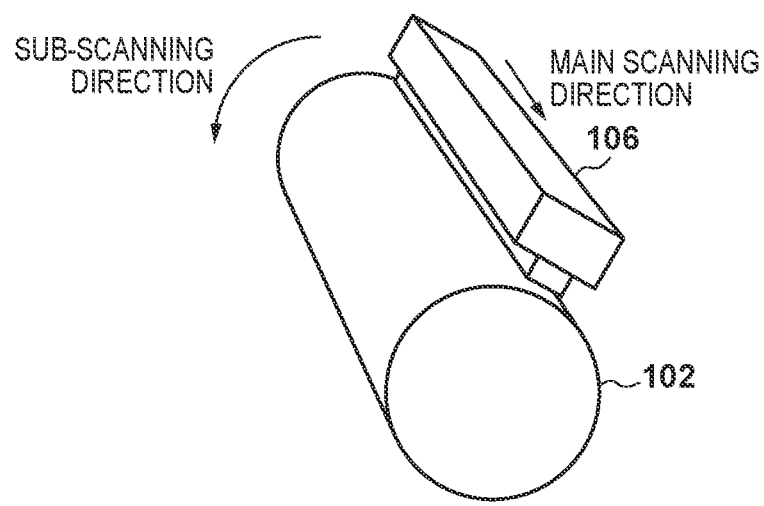
FIGS. 7A and 7B are views for explaining the arrangement of an exposure head and a photosensitive drum of the printing apparatus shown in FIG. 6.
Figure 7B:
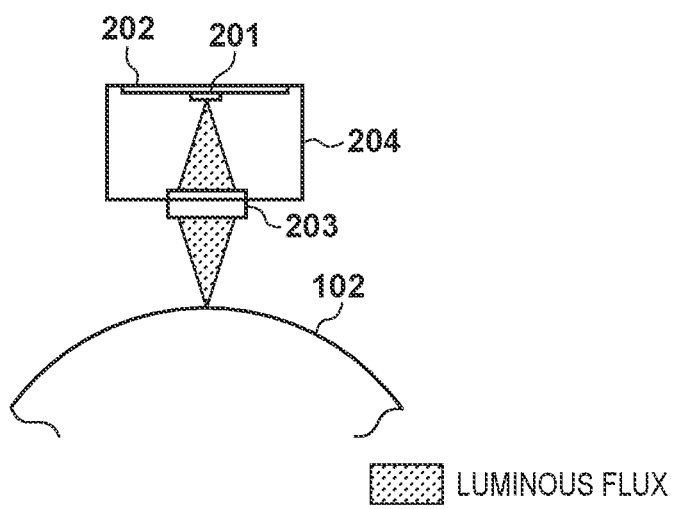

FIGS. 7A and 7B respectively show the arrangement of the exposure head 106 with respect to the photosensitive drum 102 and a state in which light emitted from a light emitting element group 201 is collected to the photosensitive drum 102 by a rod lens array 203. Each of the exposure head 106 and the photosensitive drum 102 is attached to the image forming apparatus AP by an attachment member (not shown). The exposure head 106 includes the light emitting element group 201, a printed board 202 on which the light emitting element group 201 is mounted, the rod lens array 203, and a housing 204 for attaching the rod lens array 203 and the printed board 202. In an assembly plant, the exposure head 106 individually undergoes assembly adjustment operation, thereby performing focus adjustment for adjusting a spot at a light collection position to a predetermined size, and light amount adjustment. At this time, since the exposure head 106 is arranged so that the distance between the photosensitive drum 102 and the rod lens array 203 and the distance between the rod lens array 203 and the light emitting element group 201 are predetermined intervals, an image of light emitted from the light emitting element group 201 is formed on the photosensitive drum 102. Therefore, at the time of focus adjustment, the attachment position of the rod lens array 203 is adjusted so that the distance between the rod lens array 203 and the light emitting element group 201 is set to a desired value. At the time of light amount adjustment, light emitting elements are sequentially caused to emit light, and the driving current of each light emitting element is adjusted so that light collected via the rod lens array 203 has a predetermined light amount.

FIGS. 8A and 8B show the printed board 202 on which the light emitting element group 201 and a connector 305 are arrayed.

FIG. 8A shows a surface (to be referred to as a light emitting element non-mounting surface hereinafter) opposite to a surface on which the light emitting element group 201 is mounted. FIG. 8B shows the surface (to be referred to as a light emitting element mounting surface) on which the light emitting element group 201 is mounted. The light emitting element group 201 has an arrangement in which 20 light emitting element array chips 400-1 to 400-20 are arrayed in a staggered pattern. In each light emitting element array chip, light emitting elements corresponding to the above-described load elements 23 are arrayed at a predetermined pitch in the longitudinal direction and the widthwise direction of the chip.

In this example, several hundred light emitting elements are arrayed at a pitch (about 21.16 μm) corresponding to a resolution of 1,200 dpi in the longitudinal direction of the chip, and a plurality of light emitting element arrays are arrayed in the widthwise direction of the chip. That is, the distance from one end to the other end of the several hundred light emitting points in the longitudinal direction in the chip is about 10 to 20 mm. In the light emitting element group 201, a plurality of chips are arrayed in the longitudinal direction. The light emitting element array chips 400-1 to 400-20 are arranged in two rows in a staggered pattern, and each row is arranged along the longitudinal direction of the printed board 202.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-120713, filed Jul. 28, 2022, which is hereby incorporated by reference herein in its entirety.

What is claimed is:

1. A driving device comprising:
a plurality of load blocks each including a load element;
a plurality of driving circuits configured to drive the plurality of load blocks; and
a connection circuit configured to connect the plurality of load blocks to the plurality of driving circuits, respectively,
wherein the connection circuit is configured to switch a connection combination of each of the plurality of load blocks and each of the plurality of driving circuits such that each of the plurality of load blocks is connected to a driving circuit among the plurality of driving circuits.

2. The device according to claim 1, wherein a number of the plurality of load blocks is equal to a number of the plurality of driving circuits.

3. The device according to claim 1, wherein
each of the plurality of driving circuits comprises a transistor configured to supply a current corresponding to a voltage signal, and a common voltage signal is input to a gate terminal of the transistor.

4. The device according to claim 3, wherein
the transistor is a first transistor,
in a current path formed by the load block and the driving circuit that are connected to each other among the plurality of load blocks and the plurality of driving circuits, a second transistor is further arranged between the load block and the driving circuit, and
the first transistor and the second transistor form a cascode circuit.

5. The device according to claim 4, wherein in the current path, the connection circuit is arranged between the first transistor and the second transistor.

6. The device according to claim 1, wherein
the plurality of driving circuits include a first driving circuit and a second driving circuit, and
at the time of switching driving of the load block driven by the first driving circuit among the plurality of load blocks to driving by the second driving circuit, the connection circuit is configured to switch the connection combination so that the driving by the second driving circuit is started before the driving by the first driving circuit ends.

7. The device according to claim 1, wherein a plurality of load elements including the load element are arranged in each of the plurality of load blocks.

8. The device according to claim 1, wherein the load element is a current-driven element.

9. The device according to claim 1, wherein the load elements arranged in the plurality of load blocks are arranged along one direction.

10. The device according to claim 1, wherein the load element is a light emitting element.

11. A printing apparatus comprising:
an exposure head including the driving device according to claim 1;
a light emitting element mounted as a load element on the exposure head; and
a photosensitive drum configured to receive light from the light emitting element.

12. A printing apparatus comprising:
an exposure head including the driving device according to claim 9;
a light emitting element mounted as a load element on the exposure head; and
a photosensitive drum configured to receive light from the light emitting element,
wherein a surface of the photosensitive drum that receives light from the light emitting element moves in a direction intersecting the one direction.

* * * * *